United States Patent
Anraku et al.

(10) Patent No.: US 11,485,404 B2
(45) Date of Patent: Nov. 1, 2022

(54) CONTROLLER FOR STEERING DEVICE

(71) Applicants: JTEKT CORPORATION, Osaka (JP); TOYOTA JIDOSHA KABUSHIKI KAISHA, Toyota (JP)

(72) Inventors: Koji Anraku, Okazaki (JP); Isao Namikawa, Okazaki (JP); Yusuke Kakimoto, Okazaki (JP); Yoshio Kudo, Machida (JP); Tetsuya Morino, Susono (JP)

(73) Assignees: JTEKT CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 338 days.

(21) Appl. No.: 16/821,665

(22) Filed: Mar. 17, 2020

(65) Prior Publication Data
US 2020/0298901 A1    Sep. 24, 2020

(30) Foreign Application Priority Data

Mar. 22, 2019    (JP) .............................. JP2019-055162

(51) Int. Cl.
*B62D 5/00* (2006.01)
*B62D 5/04* (2006.01)
*B62D 6/00* (2006.01)

(52) U.S. Cl.
CPC ........... *B62D 5/006* (2013.01); *B62D 5/0421* (2013.01); *B62D 6/008* (2013.01); *B62D 5/005* (2013.01); *B62D 5/0469* (2013.01)

(58) Field of Classification Search
None
See application file for complete search history.

(56) References Cited

U.S. PATENT DOCUMENTS

| 6,481,526 B1 * | 11/2002 | Millsap | .................. B62D 5/006 |
| | | | 180/402 |
| 2003/0220727 A1 * | 11/2003 | Husain | .................. B62D 6/008 |
| | | | 180/443 |

(Continued)

FOREIGN PATENT DOCUMENTS

| DE | 10 2017 203 456 A1 | 9/2018 |
| EP | 3 569 475 A1 | 11/2019 |
| JP | 2005-053416 A | 3/2005 |

OTHER PUBLICATIONS

Aug. 19, 2020 Extended Search Report issued in European Patent Application No. 20163586.9.

*Primary Examiner* — Jacob B Meyer
*Assistant Examiner* — Ryan Hardy
(74) *Attorney, Agent, or Firm* — Oliff PLC

(57) ABSTRACT

In a controller for a steering device, the steering device includes a structure where motive power transmission between a steering unit and a turning unit is separated. The controller includes a control circuit configured to control operation of a steering-side motor that is provided in the steering unit to give steering reaction force that is force against the steering input into the steering unit. In a case where turning of the turning wheels to one direction is restricted, the control circuit is configured to calculate restriction reaction force for restricting steering that is to turn the turning wheels to the one direction. The control circuit is configured to calculate the restriction reaction force based on information on the steering unit.

5 Claims, 9 Drawing Sheets

(56) References Cited

U.S. PATENT DOCUMENTS

| | | | |
|---|---|---|---|
| 2006/0080016 A1* | 4/2006 | Kasahara | B62D 6/008 |
| | | | 701/41 |
| 2019/0126971 A1* | 5/2019 | Kim | B62D 5/006 |
| 2019/0176874 A1* | 6/2019 | Sanford | B62D 6/10 |
| 2019/0176883 A1* | 6/2019 | Stanford | B62D 6/008 |
| 2020/0023893 A1* | 1/2020 | Naik | B62D 5/0466 |
| 2020/0277004 A1* | 9/2020 | Zheng | B62D 5/0463 |

* cited by examiner

CONTROLLER FOR STEERING DEVICE

CROSS-REFERENCE TO RELATED APPLICATION

This application claims priority to Japanese Patent Application No. 2019-055162 filed on Mar. 22, 2019, incorporated herein by reference in its entirety.

BACKGROUND

1. Technical Field

The present disclosure relates to a controller for a steering device.

2. Description of Related Art

Disclosed in Japanese Patent Application Publication No. 2005-53416 is a steer-by-wire steering device. In the steering device of this type, motive power transmission between a steering unit steered by a driver and a turning unit that turns turning wheels in accordance with the steering by the driver is separated. In the steer-by-wire steering device, the turning unit includes a turning-side motor, and the steering unit includes a steering-side motor. A steering controller configured to control the steer-by-wire steering device changes the travel direction of a vehicle by controlling the turning-side motor in accordance with steering of a steering wheel.

SUMMARY

In the steering controller, since the motive power transmission between the steering unit and the turning unit is separated, a correspondence relation of a steering range of the steering wheel to a turning range of turning wheels may be changed. When any deviation, including such change in the correspondence relation, is generated between the turning of the turning wheels and the steering of the steering wheel, the deviation may cause fluctuation of restriction reaction force used for restricting steering that is to turn the turning wheels to one direction in the case where the turning of the turning wheels to the one direction is restricted. As a result, a driver may feel a deteriorated steering feeling of the steering wheel.

An aspect of the present disclosure relates to a controller for a steering device. The steering device includes a structure where motive power transmission between a steering unit and a turning unit is separated, the turning unit being configured to turn turning wheels in accordance with steering that is input into a steering wheel coupled with the steering unit. The controller includes a control circuit configured to control operation of a steering-side motor that is provided in the steering unit so as to give steering reaction force that is force against the steering input into the steering unit. In a case where turning of the turning wheels to one direction is restricted, the control circuit is configured to calculate restriction reaction force for restricting steering that is to turn the turning wheels to the one direction. The control circuit is configured to calculate the restriction reaction force based on information on the steering unit.

In the configuration, while the restriction reaction force is applied, the restriction reaction force applied to the steering unit is calculated based on the information on the steering unit. Even when the deviation is generated between the steering of the steering wheel and the turning of the turning wheels, it is possible to restrain the deviation from causing fluctuation of the restriction reaction force, since the restriction reaction force to be applied to the steering unit is calculated based on the information on the steering unit. Since the restriction reaction force applied to the steering unit is stabilized, the driver can obtain stable steering feeling of the steering wheel.

In the controller, the control circuit may be configured to store a steering end position that is set closer to a neutral position side than a steering limit position of the steering wheel. The control circuit may be configured to calculate the restriction reaction force based on the steering end position and a present steering position of the steering wheel.

When deviation is generated between the steering of the steering wheel and the turning of the turning wheels, defining the restriction reaction force to be applied to the steering unit based on a turning limit of the turning wheels may cause fluctuation of the steering end position depending on the circumstances of the time. With the above configuration, a restriction reaction force calculator calculates the restriction reaction force based on the steering end angle and the present steering position as information on the steering unit. Accordingly, even when the deviation is generated between the steering of the steering wheel and the turning of the turning wheels, it is possible to restrain the deviation from causing fluctuation of the steering end position.

In the controller, the control circuit may be configured to set a changed steering end position based on a vehicle speed. The control circuit may be configured to change the steering end position to the set changed steering end position.

With the configuration, in the case where, for example, the vehicle speed is in a high speed area, it is possible to change the steering end position to the changed steering end position that is set based on the vehicle speed, so as to set the steering range of the steering wheel to be smaller than that in the case where the vehicle speed is in a middle-speed area. Thus, the steering range of the steering wheel can be set within an appropriate range in accordance with the vehicle speed.

In the controller, the control circuit may be configured to set a contact position. The contact position may be obtained by converting a turning position of the turning wheels, when the control circuit determines that one of the turning wheels comes into contact with an obstacle, into a steering position of the steering wheel based on a correspondence relation of a steering range of the steering wheel to a turning range of the turning wheels. The control circuit may be configured to calculate the restriction reaction force based on deviation between the contact position and the present steering position of the steering wheel.

When the deviation is generated between the steering of the steering wheel and the turning of the turning wheels, defining the restriction reaction force to be applied to the steering unit based on the turning position of the turning wheels and the steering position of the steering wheel may cause fluctuation of the steering end position depending on the circumstances of the time. With the configuration, the restriction reaction force calculator calculates the restriction reaction force based on the deviation between the contact position and the present steering position as information on the steering unit. Accordingly, even when the deviation is generated between the steering of the steering wheel and the turning of the turning wheels, it is possible to restrain the deviation from causing fluctuation of steering.

With the above configuration, the driver can obtain stable steering feeling of the steering wheel.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
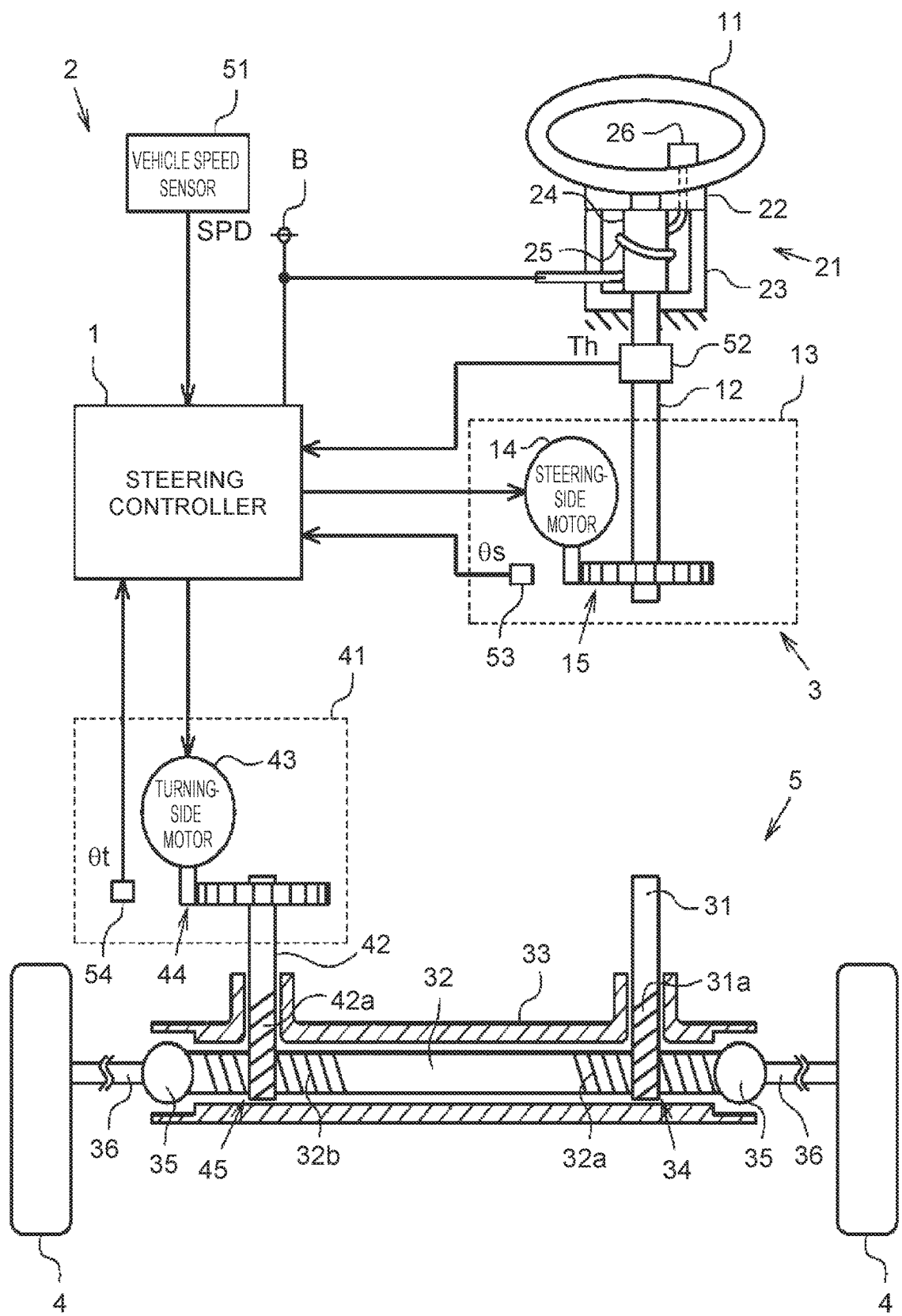
FIG. 1 is a schematic block diagram of a steer-by-wire steering device.

One embodiment of a steering controller will be described based on the drawings. As shown in FIG. 1, a steer-by-wire steering device 2 to be controlled by a steering controller 1 includes a steering unit 3 steered by a driver, and a turning unit 5 that turns turning wheels 4 in accordance with the steering of the steering unit 3 performed by the driver.

The steering unit 3 includes a steering shaft 12 fixed to a steering wheel 11, and a steering-side actuator 13 that can apply steering reaction force to the steering shaft 12. The steering-side actuator 13 includes a steering-side motor 14 used as a driving source, and a steering-side reduction gear 15 that decelerates rotation of the steering-side motor 14 and transmits the decelerated rotation to the steering shaft 12.

The steering wheel 11 is coupled with a spiral cable system 21. The spiral cable system 21 includes a first housing 22 fixed to the steering wheel 11, a second housing 23 fixed to a vehicle body, a cylindrical member 24 that is fixed to the second housing 23 and housed in a space divided by the first housing 22 and the second housing 23, and a spiral cable 25 wound around the cylindrical member 24. The cylindrical member 24 has the steering shaft 12 extending therethrough. The spiral cable 25 is an electric wire that connects between a horn 26 fixed to the steering wheel 11 and an in-vehicle electric power source B, or the like, fixed to the vehicle body. The spiral cable 25 is set sufficiently longer than a distance between the horn 26 and the in-vehicle electric power source B. The spiral cable 25 supplies electric power to the horn 26, while allowing rotation of the steering wheel 11 in a range corresponding to the length of the spiral cable 25.

The turning unit 5 includes a first pinion shaft 31 as a rotary shaft convertible into a turning angle of the turning wheels 4, a rack shaft 32 as a turning shaft coupled with the first pinion shaft 31, and a rack housing 33 that houses the rack shaft 32 in a reciprocable manner. The first pinion shaft 31 and the rack shaft 32 are arranged at a prescribed crossing angle. A first pinion gear tooth 31a formed in the first pinion shaft 31 gears with a first rack tooth 32a formed in the rack shaft 32 to constitute a first rack and pinion mechanism 34. The rack shaft 32 has an axial one end supported by the first rack and pinion mechanism 34 in a reciprocable manner. The rack shaft 32 has both ends coupled with tie rods 36 through rack ends 35 that are formed of ball joints. The top ends of the tie rods 36 are coupled with unillustrated knuckles that are attached to the turning wheels 4.

The turning unit 5 includes a turning-side actuator 41 provided through a second pinion shaft 42. The turning-side actuator 41 applies turning force to turn the turning wheels 4 to the rack shaft 32. The turning-side actuator 41 includes a turning-side motor 43 used as a driving source, and a turning-side reduction gear 44 that decelerates rotation of the turning-side motor 43 and transmits the decelerated rotation to the second pinion shaft 42. The second pinion shaft 42 and the rack shaft 32 are arranged at a prescribed crossing angle. A second pinion gear tooth 42a formed in the second pinion shaft 42 gears with a second rack tooth 32b formed in the rack shaft 32 to constitute a second rack and pinion mechanism 45. The rack shaft 32 has an axial other end supported by the second rack and pinion mechanism 45 in a reciprocable manner.

In the steering device 2 configured in this way, the turning-side actuator 41 rotationally drives the second pinion shaft 42 in response to the steering operation by the driver. The second rack and pinion mechanism 45 converts the rotation into axial movement of the rack shaft 32, which changes the turning angle of the turning wheels 4. At the time, the steering-side actuator 13 applies to the steering wheel 11 steering reaction force that is against the steering performed by the driver.

Description will be given of an electrical configuration of the present embodiment. The steering controller 1 is connected to the steering-side motor 14 and the turning-side motor 43 to control operation of the motors. The steering controller 1 includes a central processing unit (CPU) and a memory which are not illustrated. The steering controller 1 executes various control when the CPU executes programs stored in the memory every prescribed operation period.

The steering controller 1 is connected to a vehicle speed sensor 51 that detects a vehicle speed SPD of the vehicle, and a torque sensor 52 that detects a steering torque Th applied to the steering shaft 12. The torque sensor 52 is provided in a portion of the steering shaft 12 closer to the steering wheel 11 than a joining portion with the steering-side reduction gear 15. The steering controller 1 is also connected to a steering-side rotation sensor 53 that detects a rotation angle $\theta s$ of the steering-side motor 14 as a relative angle within the range of 360 degrees, the relative angle being a detection value indicating the steering amount of the steering unit 3. The steering controller 1 is also connected to a turning-side rotation sensor 54 that detects a rotation angle $\theta t$ of the turning-side motor 43 as a relative angle that is a detection value indicating the turning amount of the turning unit 5. The steering torque Th and the rotation angles $\theta s$, $\theta t$ are detected as positive values when the vehicle is steered rightward, and detected as negative values when the vehicle is steered leftward. The steering controller 1 controls operation of the steering-side motor 14 and the turning-side motor 43 based on such various state quantities.

Figure 2:
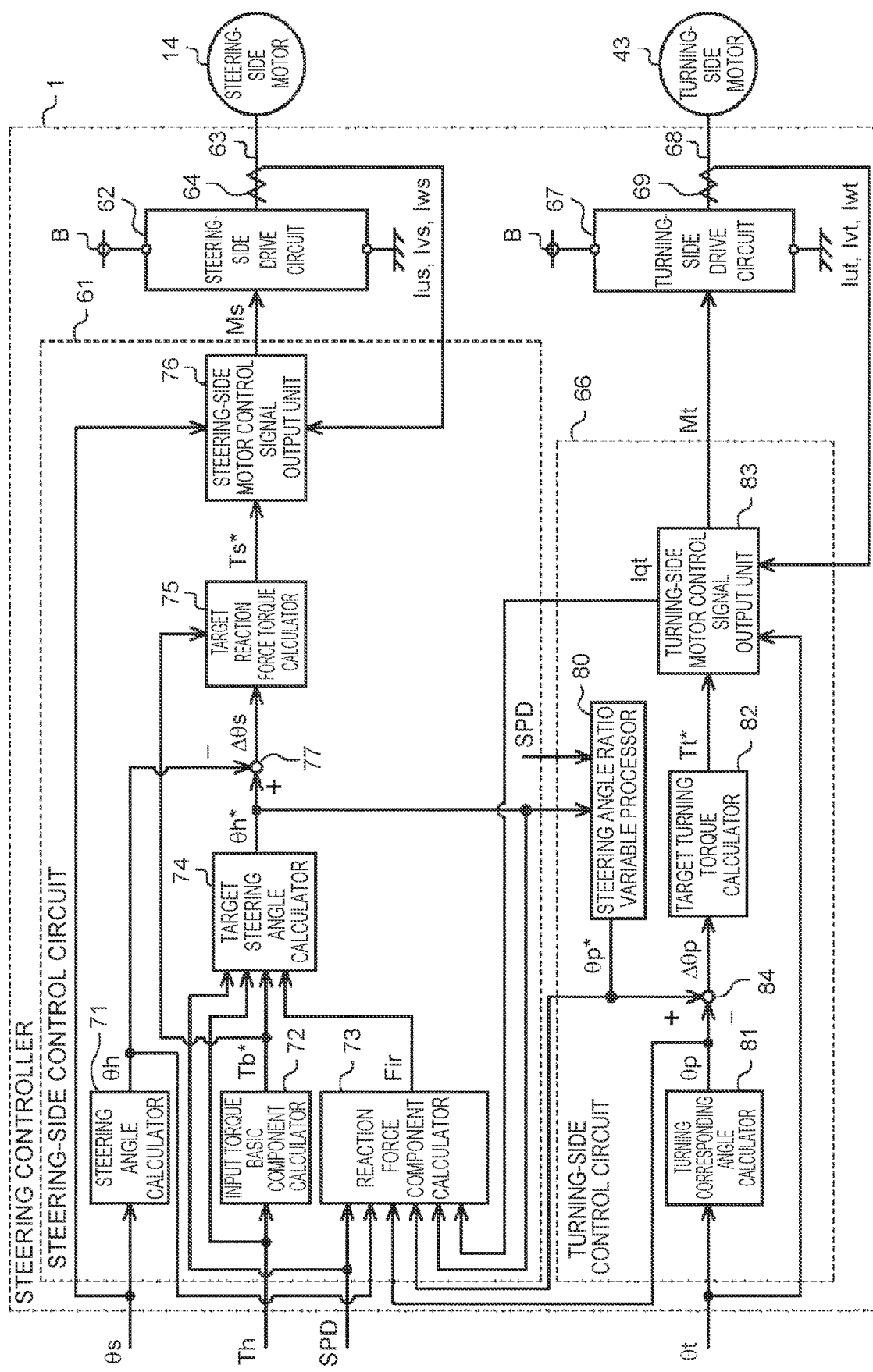
FIG. 2 is a block diagram of a steering controller.

Description will be given of the configuration of the steering controller 1. As shown in FIG. 2, the steering controller 1 includes a steering-side control circuit 61 that outputs a steering-side motor control signal Ms, and a steering-side drive circuit 62 that supplies drive electric power to the steering-side motor 14 based on the steering-side motor control signal Ms. The steering-side control circuit 61 is connected to electric current sensors 64 that detect electric current values of the steering-side motor 14 corresponding to respective phases Ius, Ivs, Iws that flow through connection lines 63 between the steering-side drive circuit 62 and motor coils of the steering-side motor 14 corresponding to the respective phases. In FIG. 2, the connection lines 63 of the respective phases and the electric current sensors 64 of the respective phases are each illustrated as a single component for convenience of description.

The steering controller 1 includes a turning-side control circuit 66 that outputs a turning-side motor control signal Mt, and a turning-side drive circuit 67 that supplies drive electric power to the turning-side motor 43 based on the turning-side motor control signal Mt. The turning-side control circuit 66 is connected to electric current sensors 69 that detect electric current values of the turning-side motor 43 corresponding to respective phases Iut, Ivt, Iwt that flow through connection lines 68 between the turning-side drive circuit 67 and motor coils of the turning-side motor 43 corresponding to the respective phases. In FIG. 2, the connection lines 68 of the respective phases and the electric current sensors 69 of the respective phases are each illustrated as a single component for convenience of description. As the steering-side drive circuit 62 and the turning-side drive circuit 67 of the present embodiment, well-known PWM inverters including a plurality of switching elements are adopted, respectively. As the switching elements, field-effect transistors (FET), or the like, are adopted. The steering-side motor control signal Ms and the turning-side motor control signal Mt are gate on-off signals that define on-off states of the switching elements, respectively.

The steering controller 1 executes calculation processes shown in respective control blocks below in each prescribed operation period, and generates the steering-side motor control signal Ms and the turning-side motor control signal Mt. When the steering-side motor control signal Ms and the turning-side motor control signal Mt are output to the steering-side drive circuit 62 and the turning-side drive circuit 67, the switching elements are each turned on and off. As a result, drive electric power is supplied from the in-vehicle electric power source B to the steering-side motor 14 and the turning-side motor 43, respectively. Thus, the operation of the steering-side actuator 13 and the turning-side actuator 41 is controlled.

Description will be given of the configuration of the steering-side control circuit 61. The steering-side control circuit 61 receives the vehicle speed SPD, the steering torque Th, the rotation angle θs, the electric current values of respective phases Ius, Ivs, Iws, a later-described turning corresponding angle θp output from the turning-side control circuit 66, and a q-axis electric current value Iqt that is a driving current of the turning-side motor 43. The steering-side control circuit 61 generates and outputs the steering-side motor control signal Ms based on each of these state quantities.

Specifically, the steering-side control circuit 61 includes a steering angle calculator 71 that calculates a steering angle θh of the steering wheel 11 based on the rotation angle θs of the steering-side motor 14. The steering-side control circuit 61 also includes an input torque basic component calculator 72 that calculates an input torque basic component Tb* that is the force to rotate the steering wheel 11, and a reaction force component calculator 73 that calculates a reaction force component Fir that is the force against the rotation of the steering wheel 11. The steering-side control circuit 61 also includes a target steering angle calculator 74 that calculates a target steering angle θh* based on the steering torque Th, the vehicle speed SPD, the input torque basic component Tb*, and the reaction force component Fir. The steering-side control circuit 61 also includes a target reaction force torque calculator 75 that calculates a target reaction force torque Ts* based on the steering angle θh and the target steering angle θh*, and a steering-side motor control signal output unit 76 that outputs the steering-side motor control signal Ms based on the target reaction force torque Ts*.

The steering angle calculator 71 converts the input rotation angle θs into an absolute angle including the range exceeding 360 degrees by, for example, counting the number of rotations of the steering-side motor 14 from a steering neutral position, and acquires the converted absolute angle. Then, the steering angle calculator 71 multiplies the rotation angle converted into the absolute angle by a conversion coefficient Ks based on a speed ratio of the steering-side reduction gear 15 to calculate the steering angle θh. The steering angle θh calculated in this way is output to a subtractor 77 and the reaction force component calculator 73.

The input torque basic component calculator 72 receives the steering torque Th. The input torque basic component calculator 72 calculates an input torque basic component Tb* that has a larger absolute value as the absolute value of the steering torque Th is larger. The input torque basic component Tb* calculated in this way is input into the target steering angle calculator 74 and the target reaction force torque calculator 75.

The target steering angle calculator 74 receives the later-described reaction force component Fir calculated in the reaction force component calculator 73, in addition to the steering torque Th, the vehicle speed SPD, and the input torque basic component Tb*. The target steering angle calculator 74 calculates the target steering angle θh* using a model expression (1) that correlates between an input torque Tin* and the target steering angle θh*, the input torque Tin* being obtained by adding the steering torque Th to the input torque basic component Tb* and subtracting the reaction force component Fir from the input torque basic component Tb*:

$$Tin^* = C \cdot \theta h^{*\prime} + J \cdot \theta h^{*\prime\prime} \tag{1}$$

The model expression defines and expresses the relation between the torque of the rotary shaft that rotates with the rotation of the steering wheel 11 and the rotation angle, when the steering wheel and the turning wheels 4, i.e., the steering unit 3 and the turning unit 5, are mechanically coupled. The model expression is expressed with use of a viscosity coefficient C that models friction of the steering device 2, or the like, and an inertia coefficient J that models the inertia of the steering device 2. The viscosity coefficient C and the inertia coefficient J are variably set in accordance with the vehicle speed SPD. The target steering angle θh* calculated using the model expression in this way is output to the reaction force component calculator 73, as well as to the subtractor 77 and a steering angle ratio variable processor 80.

The target reaction force torque calculator 75 receives an angle deviation Δθs obtained by subtracting the steering angle θh from the target steering angle θh* in the subtractor 77, in addition to the input torque basic component Tb*. Based on the angle deviation Δθs, the target reaction force torque calculator 75 calculates a basic reaction force torque serving as a basis of the steering reaction force that is applied by the steering-side motor 14 as a controlled variable used for feedback control of the steering angle θh to the target steering angle θh*. The target reaction force torque calculator 75 adds the input torque basic component Tb* to the basic reaction force torque to calculate the target reaction force torque Ts*. Specifically, the target reaction force torque calculator 75 calculates as the basic reaction force torque a sum of output values of a proportional element, an integration element, and a derivative element which use the angle deviation Δθs as an input.

The steering-side motor control signal output unit 76 receives the rotation angle θs, and the electric current values of respective phases Ius, Ivs, Iws, in addition to the target reaction force torque Ts*. The steering-side motor control signal output unit 76 of the present embodiment calculates a steering-side q-axis target current value Iqs* on a q axis in a d-q coordinate system based on the target reaction force torque Ts*. In the present embodiment, a steering-side d-axis target current value Ids* on a d axis is basically set to zero. The steering-side motor control signal output unit 76 then executes current feedback control in the d-q coordinate system to generate the steering-side motor control signal Ms output to the steering-side drive circuit 62.

Specifically, based on the rotation angle θs, the steering-side motor control signal output unit 76 maps the electric current values of respective phases Ius, Ivs, Iws on the d-q coordinate so as to calculate a d-axis electric current value Ids and a q-axis electric current value Iqs that are actual current values of the steering-side motor 14 in the d-q coordinate system. Then, the steering-side motor control signal output unit 76 calculates a target voltage value based on each current deviation on the d-axis and the q-axis such that the d-axis electric current value Ids follows the steering-side d-axis target current value Ids* and the q-axis electric current value Iqs follows the steering-side q-axis target current value Iqs*, and generates the steering-side motor control signal Ms having a duty ratio based on the target voltage value. The steering-side motor control signal Ms calculated in this way is output to the steering-side drive circuit 62. As a result, the drive electric power corresponding to the steering-side motor control signal Ms is output to the steering-side motor 14, and the operation of the steering-side motor 14 is controlled.

Description will be given of the turning-side control circuit 66. The turning-side control circuit 66 receives the rotation angle θt, the target steering angle θh*, the electric current values of respective phases Iut, Ivt, Iwt of the turning-side motor 43, and the vehicle speed SPD. The turning-side control circuit 66 generates and outputs the turning-side motor control signal Mt based on each of these state quantities.

Specifically, the turning-side control circuit 66 includes a steering angle ratio variable processor 80 that calculates a target turning angle θp* based on the target steering angle θh* and the vehicle speed SPD. The turning-side control circuit 66 includes a turning corresponding angle calculator 81 that calculates a turning corresponding angle θp corresponding to the pinion angle that is a rotation angle of the first pinion shaft 31. The turning-side control circuit 66 also includes a target turning torque calculator 82 that calculates a target turning torque Tt* based on the turning corresponding angle θp and the target turning angle θp*, and a turning-side motor control signal output unit 83 that generates the turning-side motor control signal Mt based on the target turning torque Tt*.

The steering angle ratio variable processor 80 receives the target steering angle θh* and the vehicle speed SPD. The steering angle ratio variable processor 80 stores a relation between a steering angle ratio, which is a ratio of the turning corresponding angle θp to the steering angle θh, and the vehicle speed SPD. The steering angle ratio variable processor 80 sets the steering angle ratio variably with respect to the vehicle speed SPD, and calculates the target turning angle θp* in accordance with the target steering angle θh* and the set steering angle ratio. The steering angle ratio variable processor 80 sets the steering angle ratio to be smaller, as the vehicle speed SPD is higher. Accordingly, the steering angle ratio variable processor 80 sets the steering angle ratio such that the target turning angle θp* becomes smaller than the target steering angle θh* when the vehicle speed SPD is high. The steering angle ratio variable processor 80 sets the steering angle ratio such that the target turning angle θp* becomes larger than the target steering angle θh* when the vehicle speed SPD is low.

The turning corresponding angle calculator 81 converts the input rotation angle θt into an absolute angle by counting the number of rotations of the turning-side motor 43 from a neutral position where the vehicle moves forward, and acquires the converted absolute angle. The turning corresponding angle calculator 81 multiplies the rotation angle converted into the absolute angle by a conversion coefficient Kt based on a speed ratio of the turning-side reduction gear 44 and a speed ratio of the first and second rack and pinion mechanisms 34, 45 to calculate the turning corresponding angle θp. In short, the turning corresponding angle θp corresponds to the steering angle θh of the steering wheel 11 on the assumption that the first pinion shaft 31 is coupled with the steering shaft 12. The turning corresponding angle θp calculated in this way is output to the subtractor 84 and the reaction force component calculator 73. In addition to the turning corresponding angle θp, the target turning angle θp* is input into the subtractor 84. The target turning angle θp* is a target turning corresponding angle that is a target value of the turning corresponding angle θp.

The target turning torque calculator 82 receives an angle deviation Δθp obtained by subtracting the turning corresponding angle θp from the target turning angle θp* in the subtractor 84. Based on the angle deviation Δθp, the target turning torque calculator 82 calculates a target turning torque Tt* serving as a target value of the turning force that is applied by the turning-side motor 43 as a controlled variable used for feedback control of the turning corresponding angle θp to the target turning angle θp*. Specifically, the target turning torque calculator 82 calculates as the target turning torque Tt* a sum of output values of a proportional element, an integration element, and a derivative element which use the angle deviation Δθp as an input.

The turning-side motor control signal output unit 83 receives the turning angle θt, and the electric current values of respective phases Iut, Ivt, Iwt, in addition to the target turning torque Tt*. The turning-side motor control signal output unit 83 calculates a turning-side q-axis target current value Iqt* on a q axis in the d-q coordinate system based on the target turning torque Tt*. The turning-side motor control signal output unit 83 also restricts the absolute value of the turning-side q-axis target current value Iqt* to a prescribed limit value Ilim or below based on the driving state of the turning-side motor 43. The prescribed limit value Ilim is a value that is smaller than a rated current Ir preset as the maximum value of a driving current feedable to the turning-side motor 43 and that enables smooth turning of the turning wheels 4 unless the turning wheels 4 are in contact with an obstacle such as a curbstone. The prescribed limit value Ilim is set in advance based on an experiment or the like. In the present embodiment, the turning-side d-axis target current value Idt* on the d axis is basically set to zero. The turning-side motor control signal output unit 83 then executes current feedback control in the d-q coordinate system so as to generate the turning-side motor control signal Mt output to the turning-side drive circuit 67.

Figure 3:
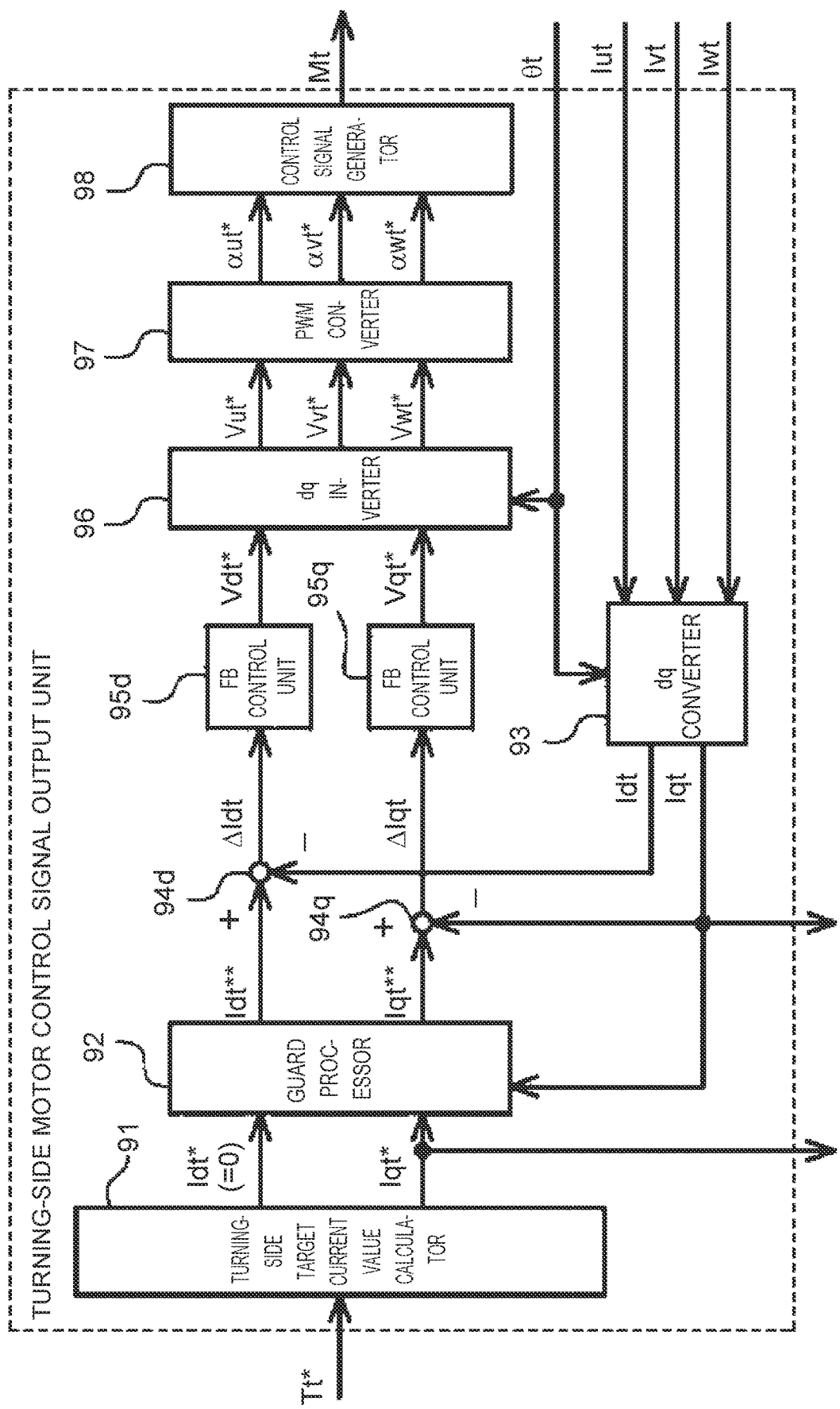
FIG. 3 is a block diagram of a turning-side motor control signal output unit.

Description will be given of the turning-side motor control signal output unit 83. As shown in FIG. 3, the turning-side motor control signal output unit 83 includes a turning-side target current value calculator 91 that calculates the turning-side d-axis target current value Idt* and the turning-side q-axis target current value Iqt*, and a guard processor 92 that restricts the absolute values of the turning-side d-axis target current value Idt* and the turning-side q-axis target current value Iqt* to be smaller.

The turning-side target current value calculator 91 receives the target turning torque Tt*. The turning-side target current value calculator 91 calculates the turning-side q-axis target current value Iqt* based on the target turning torque Tt*. Specifically, the turning-side target current value calculator 91 calculates the turning-side q-axis target current value Iqt* having a larger absolute value based on the increase in the absolute value of the target turning torque Tt*. The turning-side q-axis target current value Iqt* calculated in this way is output to the guard processor 92 and the reaction force component calculator 73. The turning-side target current value calculator 91 also outputs the turning-side d-axis target current value Idt* that indicates zero to the guard processor 92.

The guard processor 92 receives the turning-side d-axis target current value Idt*, the turning-side q-axis target current value Iqt*, and the q-axis electric current value Iqt output from a dq converter 93 described later. The guard processor 92 then restricts the absolute value of the turning-side q-axis target current value Iqt* to the prescribed limit value Ilim or below, based on the q-axis electric current value Iqt that is a value representing the driving state of the turning-side motor 43. When the absolute value of the turning-side q-axis target current value Iqt* is equal to or below the prescribed limit value Ilim due to the execution of a guard process, a restricted turning-side q-axis target current value Iqt** after restriction becomes equal to the turning-side q-axis target current value Iqt*. When the absolute value of the turning-side q-axis target current value Iqt* is larger than the prescribed limit value Ilim, the absolute value of the restricted turning-side q-axis target current value Iqt** is equal to the prescribed limit value Ilim. Since the turning-side d-axis target current value Idt* is set to zero, the guard processor 92 directly outputs the turning-side d-axis target current value Idt* as a restricted turning-side d-axis target current value Idt**.

As shown in FIG. 3, the electric current values of respective phases Iut, Ivt, Iwt input into the turning-side motor control signal output unit 83 are input into the dq converter 93. The dq converter 93 calculates the d-axis electric current value Idt and the q-axis electric current value Iqt by mapping the electric current values of respective phases Iut, Ivt, Iwt on the dq coordinates based on the rotation angle θt. The d-axis electric current value Idt is input into a subtractor 94*d* together with the restricted turning-side d-axis target current value Idt. The q-axis electric current value Iqt is input into a subtractor 94***q* together with the restricted turning-side q-axis target current value Iqt. The subtractors 94***d*, 94*q* calculate a d-axis electric current deviation ΔIdt and a q-axis electric current deviation ΔIqt, respectively. The q-axis electric current value Iqt is output also to the reaction force component calculator 73.

The d-axis electric current deviation ΔIdt and the q-axis electric current deviation ΔIqt are input into corresponding feedback (FB) control units 95*d*, 95*q*, respectively. The FB control units 95*d*, 95*q* multiply the d-axis electric current deviation ΔIdt and the q-axis electric current deviation ΔIqt by their prescribed gains to calculate a d-axis target voltage value Vdt* and a q-axis target voltage value Vqt* such that the d-axis electric current value Idt and the q-axis electric current value Iqt follow the restricted turning-side d-axis target current value Idt and the restricted turning-side q-axis target current value Iqt, respectively.

The d-axis target voltage value Vdt* and the q-axis target voltage value Vqt* are input into a dq inverter 96 together with the rotation angle θt. The dq inverter 96 calculates three-phase target voltage values Vut*, Vvt*, Vwt* by mapping the d-axis target voltage value Vdt* and the q-axis target voltage value Vqt* on a three-phase alternating current coordinate based on the rotation angle θt. Next, the target voltage values Vut*, Vvt*, Vwt* are each input into a PWM converter 97. The PWM converter 97 calculates duty command values αut*, αvt*, αwt* based on the target voltage values Vut*, Vvt*, Vwt*, and outputs the calculated values to the control signal generator 98. The control signal generator 98 compares the duty command values αut*, αvt*, αwt* with PWM carriers as carrier waves, such as triangular waves and saw tooth waves. Through the comparison, the control signal generator 98 generates a turning-side motor control signal Mt having a duty ratio indicated by the duty command value αut*, αvt*, αwt*, and outputs the signal to the turning-side drive circuit 67. As a consequence, as shown in FIG. 2, drive electric power corresponding to the turning-side motor control signal Mt is output to the turning-side motor 43, and the operation of the turning-side motor 43 is controlled.

Description will be given of the configuration of the reaction force component calculator 73. The reaction force component calculator 73 receives the vehicle speed SPD, the steering angle θh, the turning corresponding angle θp, the target steering angle θh*, the target turning angle θp*, and the q-axis electric current value Iqt.

Figure 4:
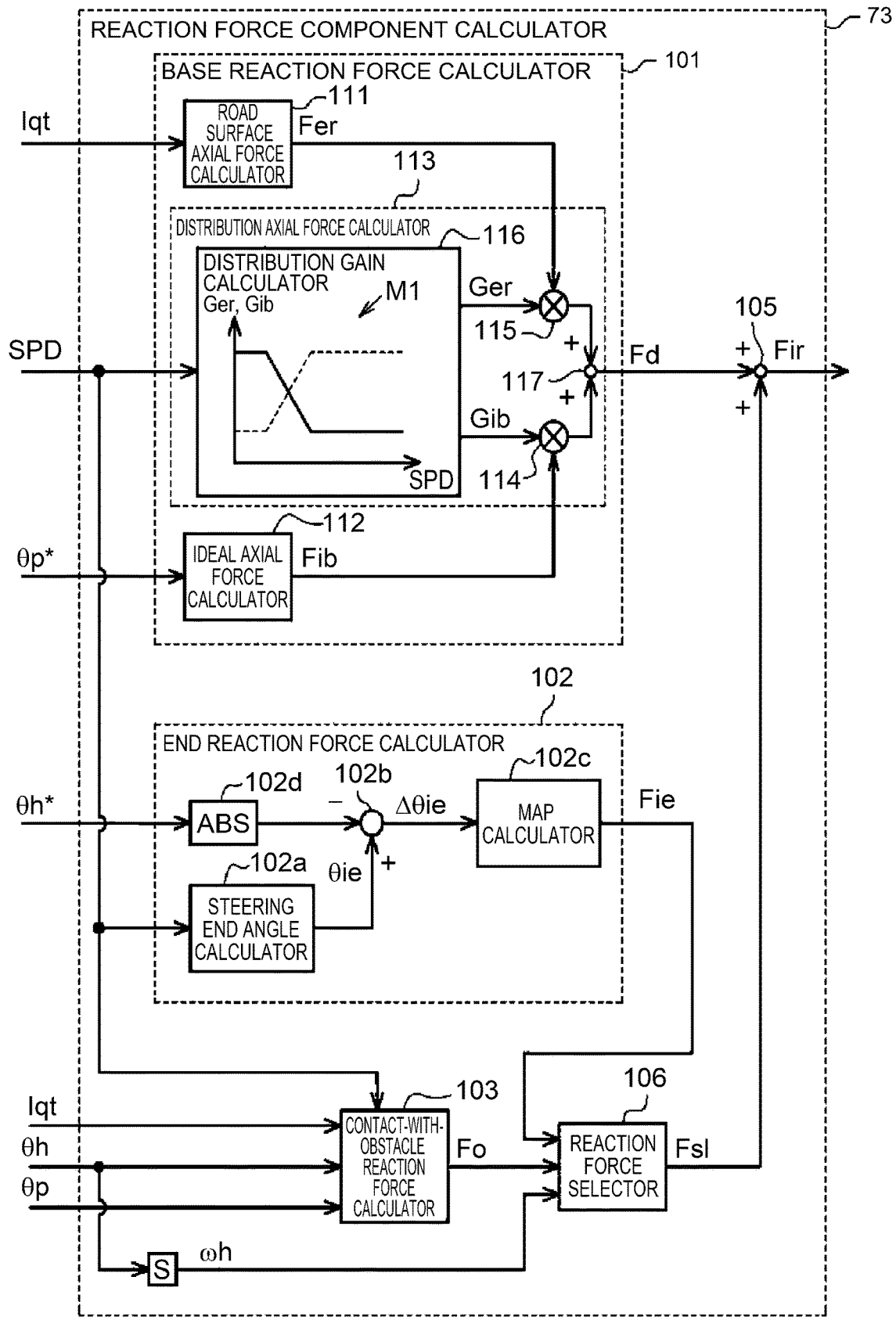
FIG. 4 is a block diagram of a reaction force component calculator.

As shown in FIG. 4, the reaction force component calculator 73 includes a base reaction force calculator 101, an end reaction force calculator 102, and a contact-with-obstacle reaction force calculator 103. The base reaction force calculator 101 calculates a base reaction force Fd corresponding to the axial force of the rack shaft 32. The end reaction force calculator 102 calculates an end reaction force Fie that is the reaction force against further abrupt steering that may be performed when the absolute value of the steering angle θh of the steering wheel 11 approaches a limit steering angle. The contact-with-obstacle reaction force calculator 103 calculates a contact-with-obstacle reaction force Fo that is against further abrupt steering, in the case where the turning wheels 4 are turned and brought into contact with an obstacle, such as a curbstone. The reaction force component calculator 73 adds the reaction force with the largest absolute value, out of the end reaction force Fie and the contact-with-obstacle reaction force Fo, to the base reaction force Fd, and outputs the resultant value as the reaction force component Fir.

The ideal axial force calculator 112 receives the target turning angle θp*. The ideal axial force calculator 112 calculates an ideal axial force Fib that is an ideal value of the axial force acting on the turning wheels 4 and that is not reflective of road surface information, based on the target turning angle θp*. The axial force acting on the turning wheels 4 is the transmission force transmitted to the turning wheels 4. Specifically, the ideal axial force calculator 112 calculates such that the absolute value of the ideal axial force Fib becomes larger, as the absolute value of the target turning angle θp* is larger. The ideal axial force Fib calculated in this way is output to a multiplier 114.

The q-axis electric current value Iqt of the turning-side motor 43 is input into a road surface axial force calculator 111. The road surface axial force calculator 111 calculates a road surface axial force Fer that is an estimate of the axial force acting on the turning wheels 4 and that is reflective of the road surface information, based on the q-axis electric current value Iqt. Specifically, the road surface axial force calculator 111 calculates the absolute value of the road surface axial force Fer to be larger, as the absolute value of the q-axis electric current value Iqt becomes larger, on the assumption that the torque applied to the rack shaft 32 by the turning-side motor 43 matches the torque corresponding to the force applied to the turning wheels 4 from the road surface. The road surface axial force Fer calculated in this way is output to a multiplier 115.

In addition to the vehicle speed SPD, the road surface axial force Fer and the ideal axial force Fib are input into a distribution axial force calculator 113. The distribution axial force calculator 113 includes a distribution gain calculator 116 that calculates distribution gains Gib, Ger that are distribution rates for distributing the ideal axial force Fib and the road surface axial force Fer based on the vehicle speed SPD. The distribution gain calculator 116 of the present embodiment includes a map M1 that defines a relation between the vehicle speed SPD and the distribution gains Gib, Ger. With reference to the map M1, the distribution gain calculator 116 calculates the distribution gains Gib, Ger corresponding to the vehicle speed SPD. As shown by a solid line, when the vehicle speed SPD is high speed, the distribution gain Gib is smaller than when the vehicle speed SPD is low speed. As shown by a broken line, when the vehicle speed SPD is high speed, the distribution gain Ger is larger than when the vehicle speed SPD is low speed. In the present embodiment, the values of the distribution gains are set such that a sum of the distribution gain Gib and the distribution gain Ger is equal to "1". The distribution gain Gib calculated in this way is output to a multiplier 114, and the distribution gain Ger is output to the multiplier 115.

The distribution axial force calculator 113 multiplies the ideal axial force Fib by the distribution gain Gib in the multiplier 114, and multiplies the road surface axial force Fer by the distribution gain Ger in the multiplier 115. In the adder 117, the distribution axial force calculator 113 adds these values to calculate the base reaction force Fd. The base reaction force Fd is distribution axial force made up of the ideal axial force Fib and the road surface axial force Fer distributed at a prescribed ratio. The base reaction force Fd calculated in this way is output to an adder 105.

The end reaction force calculator 102 receives the target steering angle θh* and the vehicle speed SPD. The end reaction force calculator 102 includes a steering end angle calculator 102a, a subtractor 102b, and a map calculator 102c.

The steering end angle calculator 102a receives the vehicle speed SPD. The steering end angle calculator 102a includes a map M2 that defines a relation between the vehicle speed SPD and a steering end angle θie. The steering end angle calculator 102a calculates the steering end angle θie corresponding to the vehicle speed SPD with reference to the map M2.

Figure 5:
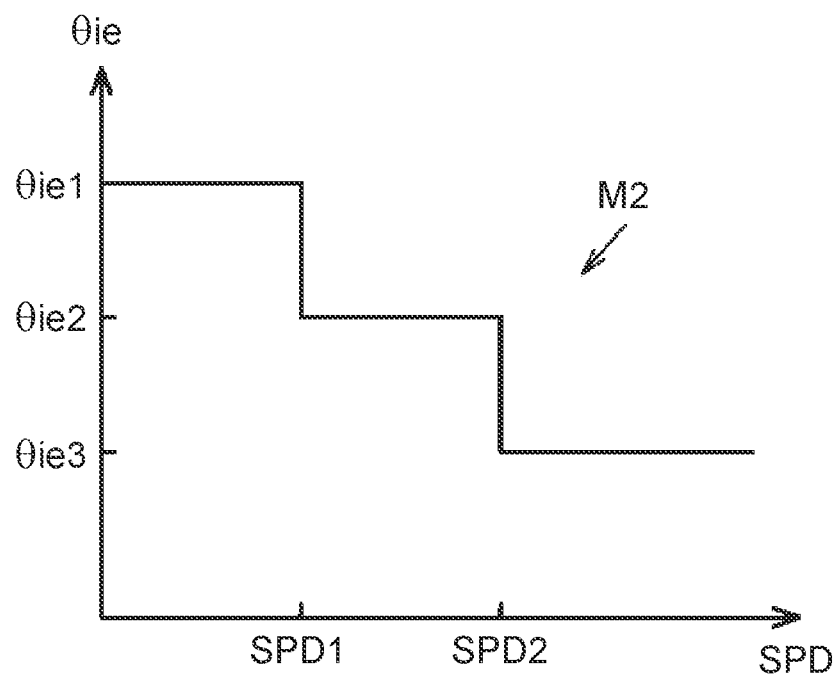
FIG. 5 is a graph showing a relation between a vehicle speed and a steering end angle.

FIG. 5 shows the map M2 that defines the relation between the vehicle speed SPD and steering end angle θie.

In the map M2, a first threshold vehicle speed SPD1 and a second threshold vehicle speed SPD2 are set. The first threshold vehicle speed SPD1 is a threshold that divides the vehicle speeds in a low-speed area and the vehicle speeds in a middle-speed area, and the second threshold vehicle speed SPD2 is a threshold that divides the vehicle speeds in the middle-speed area and the vehicle speeds in a high speed area. The second threshold vehicle speed SPD2 is set to be larger than the first threshold vehicle speed SPD1. When the vehicle speed SPD is less than the first threshold vehicle speed SPD1, the steering end angle θie is changed to a first steering end angle θie1. When the vehicle speed SPD is equal to or more than the first threshold vehicle speed SPD1 and is less than the second threshold vehicle speed SPD2, the steering end angle θie is changed to a second steering end angle θie2 that is smaller than the first steering end angle θie1. When the vehicle speed SPD is the second threshold vehicle speed SPD2 or more, the steering end angle θie is changed to a third steering end angle θie3 that is smaller than the second steering end angle θie2. The steering end angle θie calculated in this way is output to the subtractor 102b.

The subtractor 102b receives the absolute value of the target steering angle θh* calculated by the absolute value calculator 102d and the steering end angle θie. The subtractor 102b calculates an angle margin Δθie which is obtained by subtracting an absolute value of the target steering angle θh* from a steering end angle θie. The angle margin Δθie represents a margin until the steering of the steering wheel 11 reaches the steering end angle θie.

The map calculator 102c receives the angle margin Δθie calculated by the subtractor 102b. The map calculator 102c includes a map M3 that defines a relation between the angle margin Δθie and the end reaction force Fie. The map calculator 102c calculates an end reaction force Fie corresponding to the angle margin Δθie with reference to the map M3.

Figure 6:
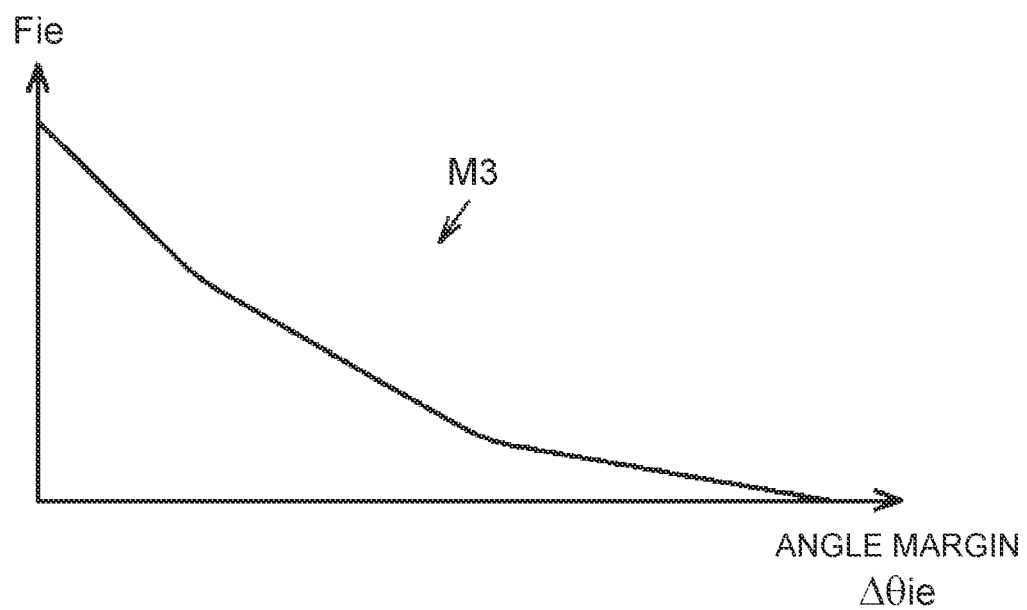
FIG. 6 is a graph showing a relation between angle margin and end reaction force.

Since the steering end angle θie is obtained based on the map M2 that defines the relation between the vehicle speed SPD and steering end angle θie, the steering end angle θie is the information on the steering unit 3 constantly defined by the steering angle θh. FIG. 6 shows the map M3 that defines the relation between the angle margin Δθie and the end reaction force Fie. In the map M3, the absolute value of the end reaction force Fie becomes larger, as the angle margin Δθie is smaller. More specifically, the absolute value of the end reaction force Fie becomes larger, as the target steering angle θh* approximates the steering end angle θie more. In the map M3, inclination of the end reaction force Fie with respect to the angle margin Δθie is set to be larger, as the angle margin Δθie becomes smaller.

In the present embodiment, on the assumption that motive power transmission is established between the steering unit 3 and the turning unit 5, the steering end position where steering of the steering wheel 11 is restricted by application of the end reaction force Fie is set closer to the neutral position than the mechanical rack end position where the axial movement of the rack shaft 32 is restricted upon contact of the rack end 35 with the rack housing 33, in the relation with a mechanical configuration of the turning unit 5. The steering end angle θie is set based on the value of the steering angle θh in the steering end position. When the vehicle speed SPD is the less than the first threshold vehicle speed SPD1, the steering end angle θie is set to a first steering end angle θie1 that is a value of the steering angle θh in the steering end position. The second steering end angle θie2 and the third steering end angle θie3 are set closer to the neutral position than the first steering end angle θie1 of the steering wheel 11. The steering end angle θie is set to be closer to the neutral position than the steering angle θh in the steering limit position of the steering wheel 11 that is maximally allowed by the spiral cable system 21. The end reaction force Fie becomes larger, as the steering angle θh approximates the steering end angle θie more. In the position closer to the steering end position than the neutral position, the absolute value of the end reaction force Fie is set to be large enough to prevent further abrupt steering by human power.

As shown in FIG. 4, the contact-with-obstacle reaction force calculator 103 receives the q-axis electric current value Iqt, the steering angle θh, the turning corresponding angle θp, and the vehicle speed SPD. The contact-with-obstacle reaction force calculator 103 of the present embodiment calculates the contact-with-obstacle reaction force Fo based on these state quantities.

Figure 7:
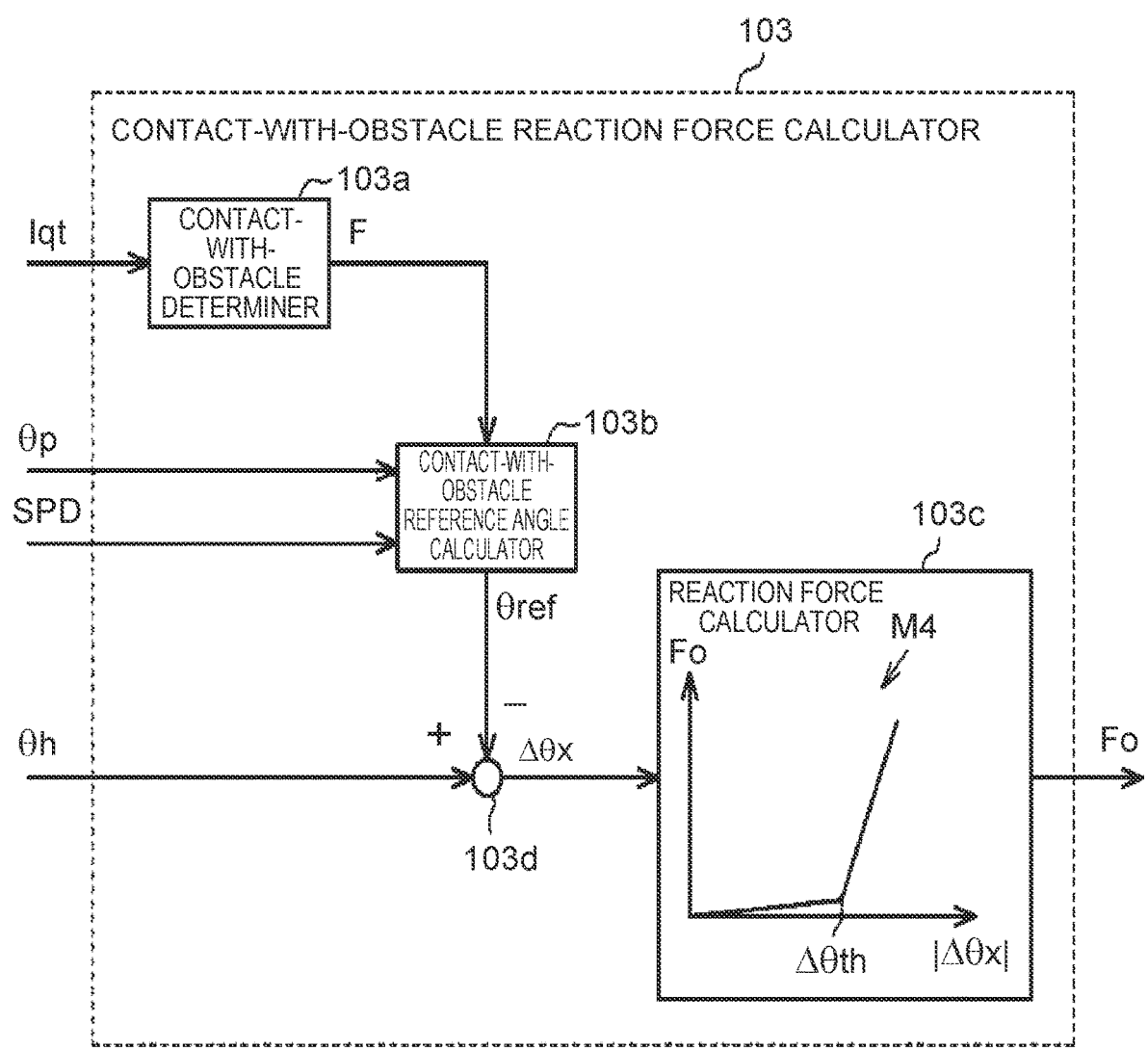
FIG. 7 is a block diagram of a contact-with-obstacle reaction force calculator.

Description will be given of the contact-with-obstacle reaction force calculator 103. As shown in FIG. 7, the contact-with-obstacle reaction force calculator 103 includes a contact-with-obstacle determiner 103a, a contact-with-obstacle reference angle calculator 103b, and a reaction force calculator 103c.

The contact-with-obstacle determiner 103a receives the q-axis electric current value Iqt. When the absolute value of the q-axis electric current value Iqt is equal to a current threshold or more, the contact-with-obstacle determiner 103a determines that one of the turning wheels 4 is in contact with an obstacle, and generates a flag F indicating the determination information. The current threshold is an electric current value that enables turning of the turning wheels 4 on a normal road surface when being supplied to the turning-side motor 43. The current threshold is set by an experiment or the like in advance. When the absolute value of the q-axis electric current value Iqt is smaller than the current threshold, the contact-with-obstacle determiner 103a determines that the turning wheels 4 are not in contact with the obstacle, and does not generate the flag F. When one of the turning wheels 4 is in contact with the obstacle, it is not possible to eliminate an angle deviation Δθp that is the deviation between the target steering angle θh* and the turning corresponding angle θp, even when the q-axis electric current value Iqt that is driving current is fed to the turning-side motor 43 to eliminate the deviation between the target steering angle θh* and the turning corresponding angle θp. Since it is not possible to eliminate the angle deviation Δθp by feeding the current of the q-axis electric current value Iqt, the steering controller 1 further increases the absolute value of the q-axis electric current value Iqt of the current flowing to the turning-side motor 43 beyond the present value. As a result, when one of the turning wheels 4 is in contact with the obstacle, the q-axis electric current value Iqt becomes equal to the current threshold or more. The flag F generated in this way is output to the contact-with-obstacle reference angle calculator 103b.

The contact-with-obstacle reference angle calculator 103b receives the turning corresponding angle θp, the vehicle speed SPD, and the flag F. When the flag F is input, that is, when it is determined that one of the turning wheels 4 is in contact with the obstacle, the contact-with-obstacle reference angle calculator 103b sets a reference angle θref based on the turning corresponding angle θp and the vehicle speed SPD. The reference angle θref is a steering angle θh of the steering wheel 11 corresponding to a contact position where one of the turning wheels 4 is determined to come into contact with the obstacle. More specifically, in the case where the steering of the steering wheel 11 corresponds to the turning of the turning wheels 4 as if motive power transmission is established therebetween, the reference angle θref is a steering angle θh when steering of the steering wheel 11 is disabled due to one of the turning wheels 4 coming into contact with the obstacle. The contact-with-obstacle reference angle calculator 103b stores a relation between a steering angle ratio and the vehicle speed SPD. The contact-with-obstacle reference angle calculator 103b obtains the steering angle ratio based on the vehicle speed SPD, and sets the reference angle θref using the obtained steering angle ratio. The contact-with-obstacle reference angle calculator 103b divides the turning corresponding angle θp by the steering angle ratio set in accordance with the vehicle speed SPD in order to convert the turning corresponding angle θp into the steering angle θh. The thus-converted angle is set as the reference angle θref. The contact-with-obstacle reference angle calculator 103b sets the reference angle θref based on the input of the flag F, and then retains the set reference angle θref until the flag F is no longer input. In the case where the flag F is not input, the contact-with-obstacle reference angle calculator 103b sets, as the reference angle θref, the converted angle obtained by converting the turning corresponding angle θp into the steering angle θh with use of the steering angle ratio, whenever the turning corresponding angle θp is input. The set reference angle θref is output to the subtractor 103d. The correspondence relation of the steering range of the steering wheel to the turning range of the turning wheels stated in the claims refers to the steering angle ratio that is variably set in accordance with the vehicle speed SPD in the present embodiment.

The reaction force calculator 103c receives an angle deviation Δθx obtained by subtracting the reference angle θref from the steering angle θh in the subtractor 103d. The reaction force calculator 103c stores a map M4. The map M4 defines a relation between the absolute value of the angle deviation Δθx and the contact-with-obstacle reaction force Fo. The reaction force calculator 103c calculates the contact-with-obstacle reaction force Fo corresponding to the angle deviation Δθx with reference to the map M4. In the map M4, an angle deviation threshold Δθth is set. In the map M4, when the angle deviation Δθx is zero, the contact-with-obstacle reaction force Fo becomes "0". The contact-with-obstacle reaction force Fo increases gradually in proportion to the increase of the angle deviation Δθx. When the angle deviation Δθx becomes larger than the angle deviation threshold Δθth, the contact-with-obstacle reaction force Fo increases rapidly in proportion to the increase of the angle deviation Δθx. The angle deviation threshold Δθth is a value large enough to be able to determine that one of the turning wheels 4 is in contact with the obstacle. The angle deviation threshold Δθth is set by an experiment or the like. The contact-with-obstacle reaction force Fo is set to have an absolute value large enough to prevent further abrupt steering by human power, once the angle deviation Δθx becomes large enough to exceed the angle deviation threshold Δθth. Accordingly, in a region where the angle deviation Δθx is equal to the angle deviation threshold Δθth or below, the contact-with-obstacle reaction force Fo reproduces the reaction force that is generated when only a tire portion of the turning wheels 4 is in contact with the obstacle. In a region where the angle deviation Δθx is larger than the angle deviation threshold Δθth, the contact-with-obstacle reaction force Fo reproduces the reaction force that is generated when a wheel portion of the turning wheels 4 is in contact with the obstacle. The contact-with-obstacle reaction force Fo calculated in this way is output to the reaction force selector 106.

The reference angle θref is obtained before calculating the contact-with-obstacle reaction force Fo. Since the reference angle θref is obtained only once during the period when one of the turning wheels 4 is in contact with an obstacle, i.e., while input of the flag F continues, the reference angle θref is the information on the steering unit 3 as long as the contact-with-obstacle reaction force Fo is being calculated. The contact-with-obstacle reference angle calculator 103b executes calculation of the contact-with-obstacle reaction force Fo with use of the reference angle θref during the period from the input of the flag F to the end of the input of the flag F. More specifically, the phrase "as long as the contact-with-obstacle reaction force Fo is being calculated" refers to during the period from when one of the turning wheels 4 comes into contact with an obstacle to when the turning wheel 4 is out of contact with the obstacle. During calculation of the contact-with-obstacle reaction force Fo, the contact-with-obstacle reaction force calculator 103 calculates the contact-with-obstacle reaction force Fo based on the reference angle θref that is the information on the steering unit 3.

As shown in FIG. 4, the reaction force selector 106 receives a steering speed ωh obtained by differentiating the steering angle θh, in addition to the end reaction force Fie and the contact-with-obstacle reaction force Fo. The reaction force selector 106 selects the reaction force having a larger absolute value, out of the end reaction force Fie and the contact-with-obstacle reaction force Fo, puts the sign of the selected reaction force to the steering speed ωh, and outputs the selected reaction force with the sign to the adder 105 as a selected reaction force Fs1. Then, the reaction force component calculator 73 adds the selected reaction force Fs1 to the base reaction force Fd in the adder 105 to obtain a reaction force component Fir, and outputs the obtained reaction force component Fir to the target steering angle calculator 74 shown in FIG. 2.

Functions and effects of the present embodiment will be described. When control of varying the steering angle ratio, or the like, is executed, the steering of the steering wheel 11 and the turning of the turning wheels 4 may be out of a certain correspondence relation. In such a case, depending on the circumstances of the time when the control of varying the steering angle ratio is executed, deviation is generated between the steering angle θh of the steering wheel 11 and the turning corresponding angle θp corresponding to the pinion angle that is the rotation angle of the first pinion shaft 31. The restriction reaction force that is the end reaction force Fie or the contact-with-obstacle reaction force Fo applied to the steering unit 3 fluctuates due to the deviation generated between the steering of the steering wheel 11 and the turning of the turning wheels 4. In the present embodiment, while the restriction reaction force is being applied, the restriction reaction force applied to the steering unit 3 is calculated based on the information on the steering unit 3. Even when the deviation is generated between the steering of the steering wheel 11 and the turning of the turning wheels 4, it is possible to restrain the deviation from causing fluctuation of the restriction reaction force, since the restriction reaction force to be applied to the steering unit 3 is calculated based on the information on the steering unit 3. Since the restriction reaction force applied to the steering unit 3 is stabilized, the driver can obtain stable steering feeling of the steering wheel 11.

When the deviation is generated between the steering of the steering wheel 11 and the turning of the turning wheels 4, defining the end reaction force Fie to be applied to the steering unit 3 based on the turning limit position of the turning unit 5 may cause fluctuation of the steering end position of the steering unit 3 depending on the circumstances of the time.

Figure 8:
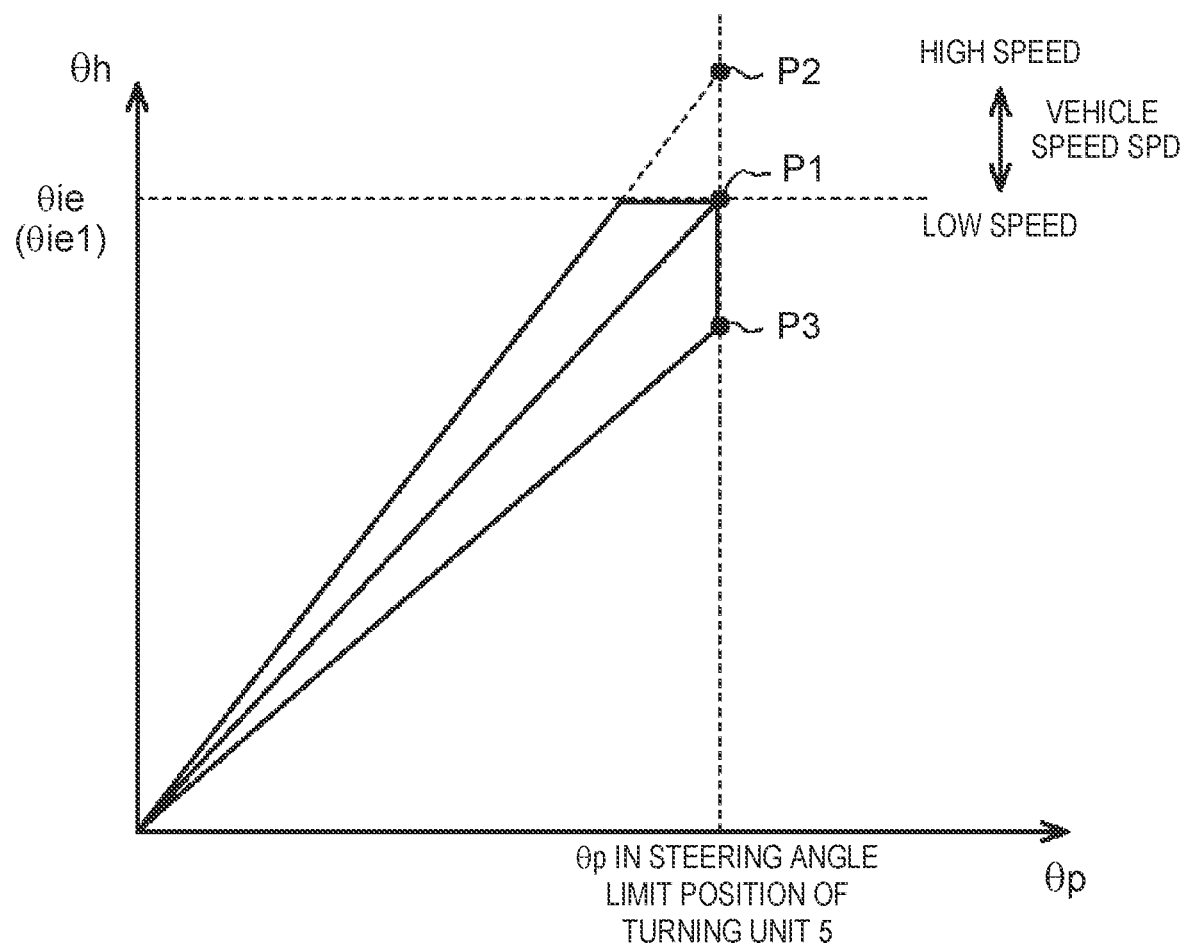
FIG. 8 is an explanatory view showing fluctuation of a steering end position.

For example, FIG. 8 shows a relation between the steering angle θh and the turning corresponding angle θp in the case where the control of varying the steering angle ratio based on the vehicle speed SPD is executed. In this case, a change amount of the steering angle θh and a change amount of the turning corresponding angle θp are different depending on the vehicle speed SPD. Here, for the purpose of simplifying the description, the vehicle speed SPD is assumed to be in the low-speed area. In this case, even when the vehicle speed SPD changes within the range of the low-speed area, the turning corresponding angle θp in a steering angle limit position of the turning unit 5 does not change. On the contrary, when a steering angle limit position of the steering unit 3 is defined based on the turning corresponding angle θp in the steering angle limit position of the turning unit 5, the steering angle limit position of the steering unit 3 fluctuates. For example, in the case where the steering of the steering wheel 11 corresponds to the turning of the turning wheels 4 as if motive power transmission is established therebetween, the steering end angle θie that is a steering angle θh in the steering angle limit position of the steering unit 3 is a first steering end angle θie1 with respect to the turning corresponding angle θp in the steering angle limit position of the turning unit 5 as shown by the point P1. In the case where the change amount of the target turning angle θp* is smaller than the change amount of the target steering angle θh*, the steering end angle θie in the steering angle limit position of the steering unit 3 is larger than the first steering end angle θie1 with respect to the turning corresponding angle θp in the steering angle limit position of the turning unit 5 as shown by a point P2. In the case where the change amount of the target turning angle θp* is larger than the change amount of the target steering angle θh*, the steering end angle θie in the steering angle limit position of the steering unit 3 is smaller than the first steering end angle θie1 with respect to the turning corresponding angle θp in the turning limit position of the turning unit 5 as shown in the point P3. Thus, the steering end angle θie that is the steering angle θh in the steering angle limit position of the steering unit 3 fluctuates.

In the present embodiment, when the vehicle speed SPD is in a prescribed speed area regardless of whether it is high speed or low speed, the steering end angle θie is set to the first steering end angle θie1. Hence, even when deviation is generated between the steering of the steering wheel 11 and the turning of the turning wheels 4, the steering end angle θie is set to the first steering end angle θie1, which can restrain fluctuation of the steering end angle θie caused by the deviation. The end reaction force calculator 102 calculates the end reaction force Fie based on the angle margin Δθie obtained by subtracting the steering end angle θie from the absolute value of target steering angle θh* that is a command value for the steering angle θh that is the present steering position. Accordingly, regardless of whether the vehicle speed SPD is high speed or low speed, the steering angle limit position of the steering unit 3 is set to the predetermined position, which can contribute to the steering feeling of the driver.

The steering end angle θie is changed to the first steering end angle θie1 to third steering end angle θie3 set based on the vehicle speed SPD, such that when the vehicle speed SPD is in the high speed area, the steering range of the steering wheel 11 is set to be smaller than when the vehicle speed SPD is the middle-speed area, and when the vehicle speed SPD is the middle-speed area, the steering range of the steering wheel 11 is set to be smaller than when the vehicle speed SPD is in the low-speed area. Thus, the steering range of the steering wheel 11 can be set within an appropriate range in accordance with the vehicle speed SPD.

When deviation is generated between the steering of the steering wheel 11 and the turning of the turning wheels 4, defining the contact-with-obstacle reaction force Fo with use of the turning corresponding angle θp that is the information on the turning unit 5 may cause fluctuation in the steering of the steering wheel 11 depending on the situations of the time.

Figure 9:
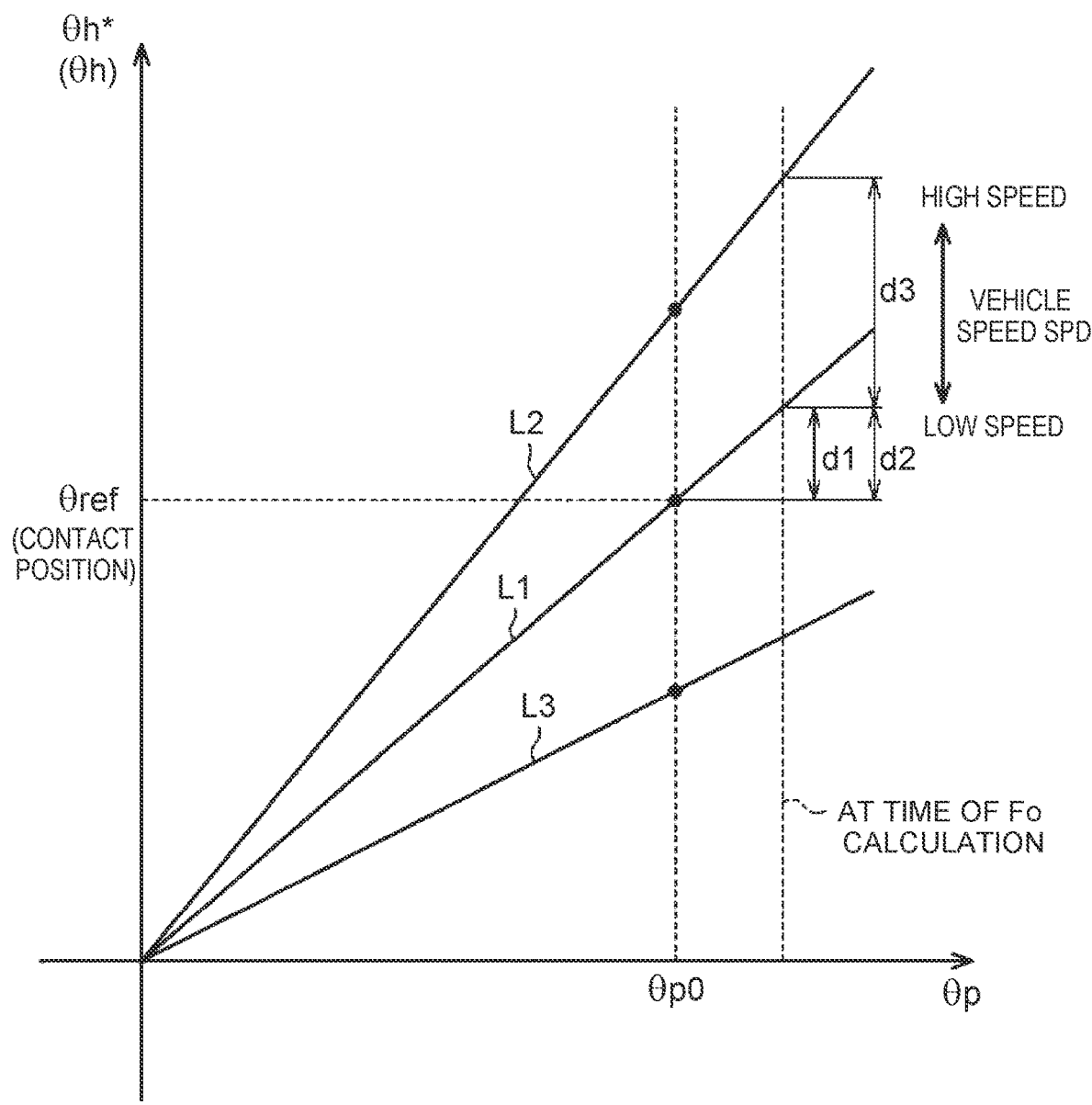
FIG. 9 is an explanatory view showing fluctuation of contact-with-obstacle reaction force.

For example, FIG. 9 shows a relation between the steering angle θh and the turning corresponding angle θp when the control of varying the steering angle ratio based on the vehicle speed SPD is executed. The same relation is established when the steering angle θh is replaced with the target steering angle θh*. An angle θp0 is a turning corresponding angle θp when one of the turning wheels 4 is in contact with an obstacle, and a reference angle θref is an angle obtained by converting the angle θp0 into a steering angle θh with use of the steering angle ratio. The reference angle θref is a steering angle θh corresponding to the contact position of the steering wheel 11 when one of the turning wheels 4 is in contact with the obstacle. Here, it is assumed that the turning corresponding angle θp when one of the turning wheels 4 is in contact with the obstacle remains unchanged even when abrupt steering of the steering wheel 11 is further performed in the direction of turning the turning wheels 4 to an obstacle side. In such a case, when one of the turning wheels 4 is in contact with the obstacle, deviation is generated between the steering of the steering wheel 11 and the turning of the turning wheels 4 attributed to one of the turning wheels 4 coming into contact with the obstacle.

As a comparative example, the case where the contact-with-obstacle reaction force Fo is calculated based on the deviation between the steering angle θh of the steering wheel 11 and the turning corresponding angle θp of the turning wheels 4 will be described. For example, as indicated by relation L1, in the case where the steering of the steering wheel 11 corresponds to the turning of the turning wheels 4 as if motive power transmission is established therebetween, a deviation d1 between the steering angle θh in a present steering position and the steering angle θh in a contact position reflects the deviation between the steering of the steering wheel 11 and the turning of the turning wheels 4 attributed to one of the turning wheels 4 coming in contact with the obstacle. As indicated by relation L2, in the case where the change amount of the target turning angle θp* is smaller than the change amount of the target steering angle θh*, deviation between the steering angle θh in the present steering position and the steering angle θh in the contact position includes a deviation d2 attributed to one of the turning wheels 4 coming into contact with the obstacle as well as a deviation d3 attributed to the steering angle ratio. Such deviations that are not attributed to one of the turning wheels 4 coming into contact with the obstacle are also generated in a similar manner in the case where the change amount of the target turning angle θp* is larger than the change amount of the target steering angle θh*, as indicated by relation L3. If a large contact-with-obstacle reaction force Fo is calculated, there is a possibility that the steering wheel 11 may be returned in the direction opposite to the abrupt steering of the steering wheel 11. When the steering wheel 11 is returned in the direction opposite to the abrupt steering, the deviation between the steering angle θh and the turning corresponding angle θp decreases. This may reduce the contact-with-obstacle reaction force, resulting in encouraging another abrupt steering of the steering wheel 11. Thus, the steering of the steering wheel 11 may wobble depending on the circumstances of the time.

In the present embodiment, the contact-with-obstacle reaction force calculator 103 calculates the contact-with-obstacle reaction force Fo based on the deviation between the reference angle θref as information on the steering unit 3 and the target steering angle θh* that is the present steering position. The contact-with-obstacle reference angle calculator 103b converts the turning corresponding angle θp in the case where it is determined that one of the turning wheels 4 comes into contact with the obstacle into the steering angle θh based on the steering angle ratio set in accordance with the vehicle speed SPD, and sets the converted value as the reference angle θref. Therefore, as indicated by the relation L2, even when the change amount of the target turning angle θp* is smaller than the change amount of the target steering angle θh*, the deviation between the target steering angle θh* and the reference angle becomes the deviation d2 attributed to one of the turning wheels 4 coming into contact with the obstacle. This applies when the change amount of the target turning angle θp* is larger than the change amount of the target steering angle θh* as indicated by the relation L3. In this case, the deviation between the target steering angle θh* and the reference angle θref attributes to one of the turning wheels 4 coming into contact with the obstacle. Thus, the contact-with-obstacle reaction force calculator 103 calculates the contact-with-obstacle reaction force Fo based on the deviation between the reference angle θref as information on the steering unit 3 and the target steering angle θh* as the present steering position. Accordingly, even when the deviation is generated between the steering of the steering wheel 11 and the turning of the turning wheels 4, it is possible to restrain the deviation from causing fluctuation in steering.

The present embodiment may be modified as follows. Following embodiments other than the present embodiment can be combined with each other without departing from the range of technical consistency. In the present embodiment, the steering end angle calculator 102a sets the steering end angle θie in three stages in accordance with the vehicle speed SPD. However, without being limited thereto, the steering end angle calculator 102a may set the steering end angle θie in two stages, or may set in four stages or more.

In the present embodiment, the steering end angle calculator 102a may continuously set the steering end angle θie in accordance with the vehicle speed SPD, and variation forms of the steering end angle θie with respect to the vehicle speed SPD may properly be changed.

Although the steering end angle θie is set in accordance with the vehicle speed SPD in the present embodiment, the steering end angle θie may be set in accordance with other parameters other than the vehicle speed SPD. In the present embodiment, when the angle deviation Δθx is equal to or less than the angle deviation threshold Δθth, the reaction force calculator 103c calculates the contact-with-obstacle reaction force Fo that increases gradually in proportion to the increase of the angle deviation Δθx. However, without being limited thereto, the reaction force calculator 103c calculates the contact-with-obstacle reaction force Fo as "0."

In the present embodiment, the reaction force calculator 103c makes the inclination of the contact-with-obstacle reaction force Fo with respect to the angle deviation Δθx different between when the angle deviation Δθx is equal to or less than the angle deviation threshold Δθth and when the angle deviation Δθx is larger than the angle deviation threshold Δθth. However, the present disclosure is not limited to the configuration. For example, when the angle deviation Δθx is zero, the reaction force calculator 103c may calculate "0" as the contact-with-obstacle reaction force Fo, and when the angle deviation Δθx increases, the reaction force calculator 103c may calculate the contact-with-obstacle reaction force Fo such that an absolute value thereof becomes larger in proportion to the increase of the angle deviation Δθx.

Although the contact-with-obstacle determiner 103a determines that one of the turning wheels 4 is in contact with an obstacle based on the q-axis electric current value Iqt in the present embodiment, the present disclosure is not limited to the configuration. For example, the contact-with-obstacle determiner 103a may determine that one of the turning wheels 4 is in contact with the obstacle based on the turning speed obtained by differentiating the angle deviation Δθx and the turning corresponding angle θp in addition to the q-axis electric current value Iqt. Thus, the contact-with-obstacle determiner 103a may determine that one of the turning wheels 4 is in contact with the obstacle based on other parameters.

In the present embodiment, the reaction force calculator 103c calculates the contact-with-obstacle reaction force Fo corresponding to the angle deviation Δθx that is the deviation between the target steering angle θh* and the reference angle θref. However, without being limited to this, the reaction force calculator 103c may calculate the contact-with-obstacle reaction force Fo in accordance with other parameters, such as the q-axis electric current value Iqt.

In the present embodiment, the contact-with-obstacle reference angle calculator 103b sets a value obtained by converting the turning corresponding angle θp when the flag F is input as the reference angle θref. However, without being limited to this, the contact-with-obstacle reference angle calculator 103b may set the steering angle θh when the flag F is input as the reference angle θref.

In the present embodiment, when determining that one of the turning wheels 4 is in contact with an obstacle, the contact-with-obstacle determiner 103a generates the flag F indicating the determination. However, when determining that the turning wheels 4 are not in contact with an obstacle, the contact-with-obstacle determiner 103a may also generate a flag indicating the determination.

In the present embodiment, the reaction force component calculator 73 may include an additional reaction force calculator that calculates additional reaction force used for notifying the situation of the turning wheels 4, in addition to the contact-with-obstacle reaction force calculator 103 and the end reaction force calculator 102.

In the present embodiment, the contact-with-obstacle reaction force calculator 103 uses the q-axis electric current value Iqt when determining whether one of the turning wheels 4 is in contact with an obstacle. However, without being limited to this, the contact-with-obstacle reaction force calculator 103 may use the turning-side q-axis target current value Iqt*.

Although the steering angle ratio is variable in accordance with the vehicle speed SPD in the present embodiment, the steering angle ratio between the steering angle θh and the turning corresponding angle θp may be constant. Although the control of varying the steering angle ratio is described as the control regarding the deviation generated between the steering of the steering wheel 11 and the turning of the turning wheels 4 in the present embodiment, the control regarding the deviation is not limited to this. For example, the control regarding the deviation generated between the steering of the steering wheel 11 and the turning of the turning wheels 4 may include smoothing control that delays the speed of changing the turning of the turning wheels 4 with respect to the speed of changing the steering of the steering wheel 11.

Although the road surface axial force Fer is calculated based on the q-axis electric current value Iqt in the present embodiment, the calculation method is not limited to this. Other methods, such as calculating based on change in yaw rate or the vehicle speed SPD, may be adopted. As yet another method, a pressure sensor, or the like, that can detect axial force may be provided in the rack shaft 32, and the detection result may be used as the road surface axial force Fer.

Although the ideal axial force Fib is calculated based on the target steering angle θh* in the present embodiment, the ideal axial force Fib may be calculated based on other parameters, such as the steering angle θh. The ideal axial force Fib may also be calculated by other methods which use other parameters, such as the steering torque Th or the vehicle speed SPD, in addition to the target steering angle θh.

In the present embodiment, the distribution axial force calculator 113 may calculate the distribution gains Gib, Ger based on other parameters in addition to the vehicle speed SPD. For example, in a vehicle that can select a drive mode out of a plurality of drive modes that indicate the setting states of control patterns of an on-vehicle engine and the like, the selected drive mode may be used as parameters for setting the distribution gains Gib, Ger. In this case, it is possible to adopt the configuration where the distribution axial force calculator 113 includes a plurality of maps for corresponding drive modes different in tendency toward the vehicle speed SPD, and the distribution gains Gib, Ger are calculated with reference to the maps.

In the present embodiment, the target steering angle calculator 74 sets the target steering angle θh* based on the steering torque Th, the input torque basic component Tb*, the reaction force component Fir, and the vehicle speed SPD. However, without being limited to the configuration, the target steering angle calculator 74 may set the target steering angle θh* without, for example, the vehicle speed SPD, as long as the setting thereof is performed based on at least the steering torque Th, the input torque basic component Tb*, and the reaction force component Fir.

In the present embodiment, the target steering angle calculator 74 may calculate the target steering angle θh* with use of a model expression that uses a spring coefficient determined based on the specifications of a suspension or wheel alignment, the model expression being modeled by adding a so-called spring term.

In the present embodiment, the target reaction force torque calculator 75 adds the input torque basic component Tb* to the basic reaction force torque to calculate the target reaction force torque Ts*. However, the present disclosure is not limited to the configuration. For example, the basic reaction force torque may be calculated directly as the target reaction force torque Ts* without addition of the input torque basic component Tb*.

In the present embodiment, instead of the first rack and pinion mechanism 34, another component such as a bush may be used to support the rack shaft 32. For example, in the present embodiment, the turning-side motor 43 may be disposed coaxially with the rack shaft 32, or the turning-side motor 43 may be disposed in parallel with the rack shaft 32 as the turning-side actuator 41.

In the present embodiment, the steering device 2 to be controlled by the steering controller 1 is a linkless steer-by-wire steering device having the steering unit 3 and the turning unit 5 being mechanically separated. However, without being limited to this, the steering device 2 may be a steer-by-wire steering device that can mechanically connect and disconnect between the steering unit 3 and the turning unit 5 with a clutch.

Figure 10:
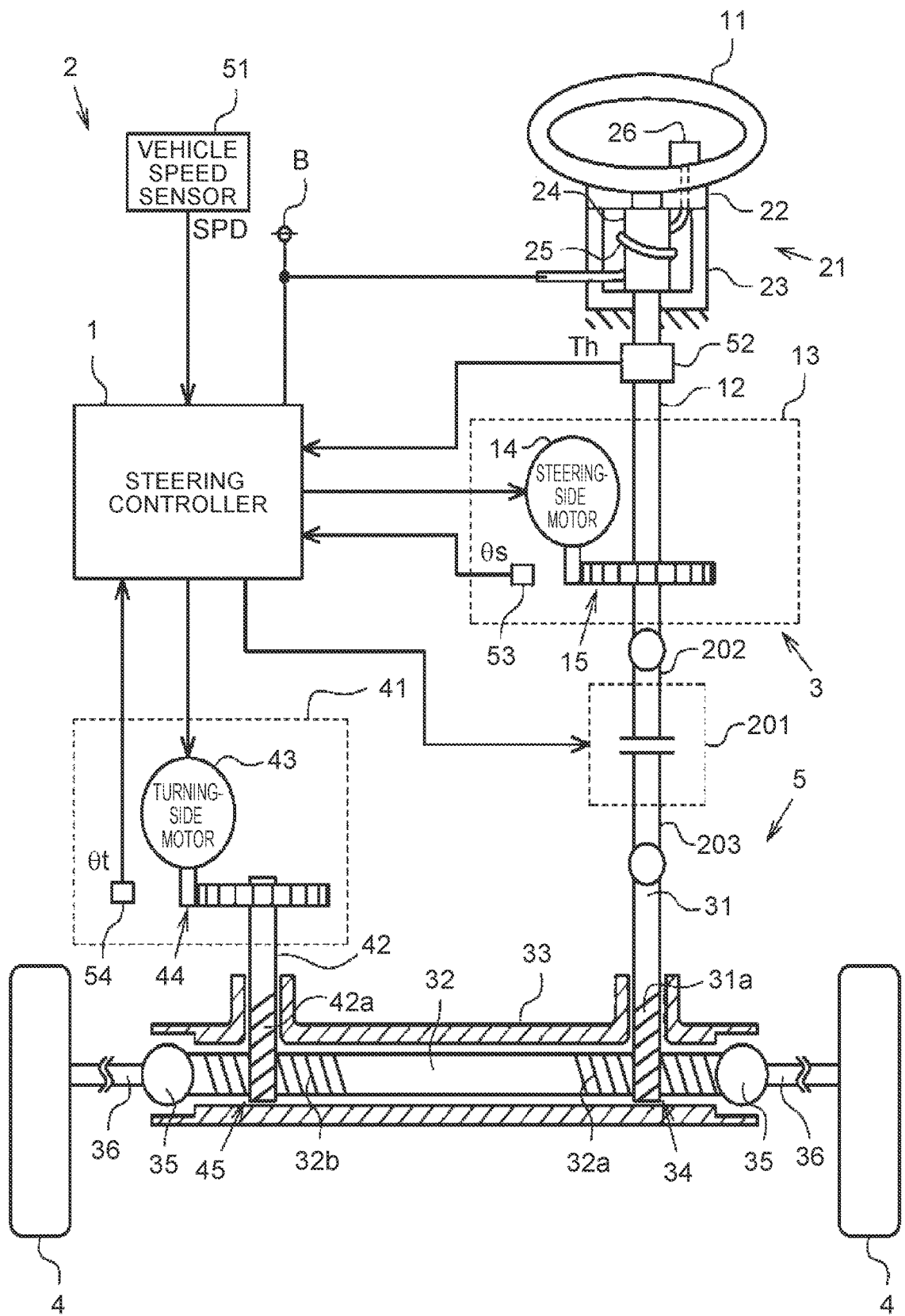
FIG. 10 is a block diagram of a steer-by-wire steering device in another embodiment.

For example, in the example shown in FIG. 10, a clutch 201 is provided between the steering unit 3 and the turning unit 5. The clutch 201 is coupled with the steering shaft 12 through an input-side intermediate shaft 202 that is fixed to an input side element, and is also coupled with the first pinion shaft 31 through an output-side intermediate shaft 203 that is fixed to an output side element. When the clutch 201 is in a released state by a control signal from the steering controller 1, the steering device 2 is put in a steer-by-wire mode. When the clutch 201 is in an engaged state, the steering device 2 is put in an electric steering mode.

What is claimed is:

1. A controller for a steering device of a vehicle that has a steering wheel and turning wheels, the steering device including a structure where motive power transmission between a steering unit and a turning unit is separated, the turning unit being configured to turn the turning wheels in accordance with steering that is input into the steering wheel that is coupled with the steering unit, the controller comprising a control circuit configured to control operation of a steering-side motor of the steering unit so as to give the steering wheel a steering reaction force that is force against the steering input into the steering wheel of the steering unit, wherein:

the control circuit is configured to, in a case where turning of the turning wheels to one direction is restricted, calculate a restriction reaction force for restricting steering that is to turn the turning wheels to the one direction; and the control circuit is configured to calculate the restriction reaction force based on information on the steering unit by:

(i) storing a steering end angle of the steering wheel that is set closer to a neutral position than a steering limit position of the steering wheel;

(ii) setting a changed steering end angle based on the steering end angle that is stored and a vehicle speed of the vehicle;

(iii) calculating an end reaction force based on the changed steering end angle that has been set and a present steering angle of the steering wheel;

(iv) calculating a contact-with-obstacle reaction force based on a current value of a turning-side motor of the turning unit, the contact-with-obstacle reaction force being calculated in parallel with the end reaction force; and (v) selecting one of the end reaction force and the contact-with-obstacle reaction force as the restriction reaction force.

2. The controller according to claim 1, wherein:

the control circuit is configured to set a contact position, the contact position being obtained by converting a turning position of the turning wheels, when the control circuit determines that one of the turning wheels comes into contact with an obstacle, into a steering position of the steering wheel based on a correspondence relation of a steering range of the steering wheel to a turning range of the turning wheels; and the control circuit calculates the contact-with-obstacle reaction force based on deviation between the contact position and a present steering position of the steering wheel.

3. The controller according to claim 1, wherein:

the control circuit selects as the restriction reaction force, the one of the end reaction force and the contact-with-obstacle reaction force whose absolute value is largest.

4. The controller according to claim 1, wherein:

the control circuit calculates the end reaction force based on an angle margin $\Delta\theta ie$ which is a value obtained by subtracting an absolute value of a target steering angle from the changed steering end angle that has been set.

5. The controller according to claim 4, wherein:

an absolute value of the end reaction force increases as the angle margin $\Delta\theta ie$ decreases.

* * * * *